(No Model.) 2 Sheets—Sheet 1.
C. C. BRADLEY.
ROAD CART.
No. 502,028. Patented July 25, 1893.
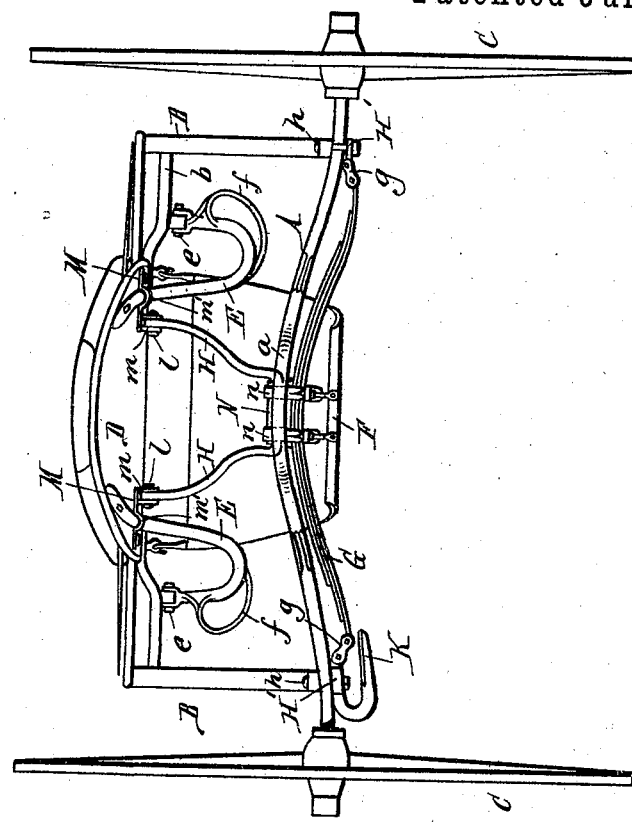
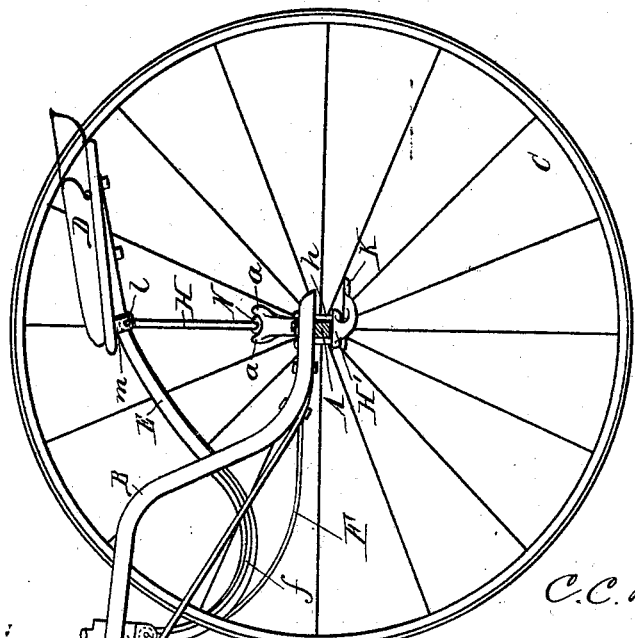
Witnesses:
T. Gustav Wilhelm.
Chas. F. Burkhardt.
C. C. Bradley
Inventor.
By Wilhelm Bonner
Attorneys.

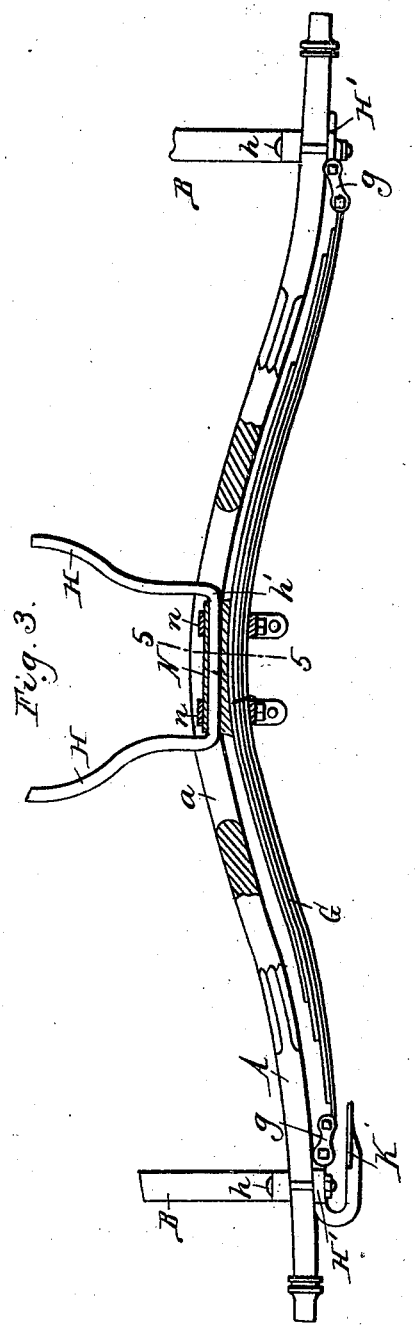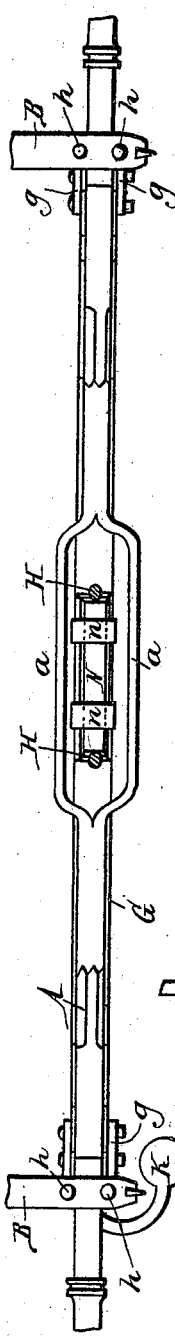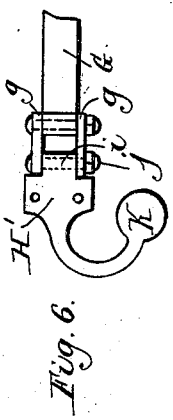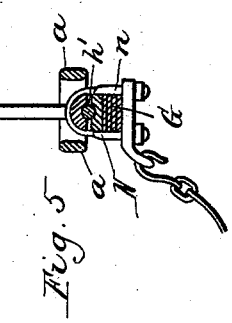

UNITED STATES PATENT OFFICE.

CHRISTOPHER C. BRADLEY, OF SYRACUSE, NEW YORK.

ROAD-CART.

SPECIFICATION forming part of Letters Patent No. 502,028, dated July 25, 1893.

Application filed March 31, 1893. Serial No. 468,523. (No model.)

*To all whom it may concern:*

Be it known that I, CHRISTOPHER C. BRADLEY, a citizen of the United States, residing at Syracuse, in the county of Onondaga and State of New York, have invented new and useful Improvements in Road-Carts, of which the following is a specification.

This invention relates to that class of two-wheeled vehicles or carts in which the seat is supported by longitudinal bars which are pivoted at their front ends to the shafts, or a cross bar connecting the shafts, and by standards which extend from the seat downwardly to a transverse spring which is hung to the axle.

The objects of this invention are to stiffen the axle and prevent the same from becoming sprung, to prevent the twisting of the transverse spring, and to improve the vehicle in other respects.

In the accompanying drawings consisting of two sheets:—Figure 1 is a longitudinal sectional elevation of a cart provided with my improvements. Fig. 2 is a rear elevation thereof. Fig. 3 is a sectional transverse view on an enlarged scale, of the axle, spring and connecting parts. Fig. 4 is a top plan view of these parts. Fig. 5 is a vertical cross section in line 5—5, Fig. 3. Fig. 6 is a top plan view of one of the clip plates to which the spring is hung, and connecting parts.

Like letters of reference refer to like parts in the several figures.

A represents the axle having its bed or body divided at the middle in the longitudinal direction of the axle into two parallel branches $a$ so as to form a loop which has a greater width than the solid portion of the axle and in which the opening between the branches $a$ is of sufficient size to accommodate the parts which connect the seat with the spring. This loop also stiffens the axle and enables the latter to better resist strains which tend to spring it.

B represents the shafts which are secured with their rear ends to the axle and have their elevated front portions connected by a transverse bar $b$ in the usual manner.

C represents the wheels.

D represents the seat, and E the longitudinal seat bars which extend forwardly and downwardly from the seat and have their front ends turned upwardly and connected by transverse pivots $e$ to the cross bar $b$ of the shafts in a well known manner, so that these seat bars can swing vertically. These seat bars are preferably constructed of steel or similar metal and are provided on their outer sides with stirrups $f$ which are also made of such metal and welded to the seat bars, thereby rendering the bars light and very strong.

F represents the usual removable foot rest arranged between the seat bars.

G represents the spring which is arranged transversely in the vehicle underneath the axle, and H represents the seat standards which connect the seat with the raised central part of the spring.

$g$ represents links by which the ends of the spring are connected with the axle on the under side of the latter.

H' represents the clip plates arranged on the under side of the axle below the rear ends of the shafts, and $h$ the vertical bolts which are arranged on the front and rear sides of the axle and pass through the clip plates and shafts and secure these parts together.

$i$ represents a longitudinal eye formed on the inner end of each clip plate and receiving the longitudinal bolt $j$ by which the links $g$ are pivoted to the clip plate. This construction produces a very simple and strong connection of the parts and locates the pivotal points of the links on the under side of the axle, whereby the downward strain applied to the spring is prevented from springing the axle arms upwardly and the lower portions of the wheels outwardly, which would occur if the pivotal points of the links were arranged above the axle.

K represents the steps which are preferably formed in one piece with the clip plates.

The upper ends of the seat standards H are connected to the seat, on the under side thereof, by transverse pivots $l$ which pass through ears $m$ secured to the under side of the seat. The base plates M of these ears are provided with downwardly curved portions $m'$ which embrace the lower sides of the rear portions of the seat bars and assist in holding the latter against transverse displacement. The lower ends of the seat standards are connected by a transverse support $h'$, which is preferably formed in one piece with the standards. This support is arranged in a bearing N which is secured to the upper side of the spring by clips $n$ underneath the central, divided portion of the axle preferably, in such manner that the support $l$ can turn in this bearing. This enables the seat standards to rock slightly backwardly and forwardly about a pivotal point located at their lower ends and enables the seat standards to follow the swinging motion of the seat arms more readily without cramping or twisting the spring. The seat standards pass through the opening in the divided central portion of the axle and so apply the load to the spring and axle in the same vertical plane, which arrangement also assists in preventing torsional or twisting strains.

I claim as my invention—

1. The combination with the axle divided at its middle, the shafts secured thereto, the spring arranged underneath the axle, and the seat, of seat bars extending forwardly from the seat and supported at their front ends by transverse pivots, and seat standards connected at their upper ends to the seat and passing through the opening of the axle to the spring, to which the lower ends of the seat standards are connected, substantially as set forth.

2. The combination with the axle divided at its middle, the shafts secured thereto, the transverse spring arranged underneath the axle, and the seat, of seat bars extending forwardly from the seat and supported at their front ends by transverse pivots, seat standards extending downwardly from the seat through the opening of the axle and connected to the spring at their lower ends by a transverse pivot, and links connecting the ends of the spring to the axle and having their pivotal points below the axle, substantially as set forth.

Witness my hand this 28th day of March, 1893.

CHRISTOPHER C. BRADLEY.

Witnesses:
C. S. BUNNELL,
E. W. PITKIN.